Patented Dec. 26, 1950

2,535,060

UNITED STATES PATENT OFFICE 2,535,060

CATALYTIC PROCESS FOR PREPARING ALCOHOLS

William F. Gresham, Wilmington, Del., assignor to E. I. du Pont de Nemours and Company, Wilmington, Del., a corporation of Delaware No Drawing. Application June 15, 1949, Serial No. 99,343

9 Claims. (Cl. 260—449)

This invention relates to a catalytic process for preparing alcohols. In particular embodiments, it relates to a process for synthesizing alcohols from carbon monoxide and hydrogen.

It is known that, in the presence of specific catalysts and under certain conditions of temperature and pressure, carbon monoxide and hydrogen react to give methanol and higher alcohols. It is also known that under other conditions, involving the use of ruthenium catalysts, the reaction leads to paraffin waxes. Under the procedural conditions heretofore known, straight chain alcohols higher than methanol have been obtained in the catalytic reaction of carbon monoxide with hydrogen, but it has not been possible by these previously known processes to obtain straight chain alcohols having from 2 to 10 carbon atoms per molecule efficiently or in good yield.

An object of this invention is to prepare straight chain primary alcohols efficiently by reaction between carbon monoxide and hydrogen. Another object is to prepare primary alcohols in which the number of carbon atoms per molecule is from 2 to 10. Other objects of the invention appear hereinafter.

This invention provides a process for preparing alcohols, and more particularly straight chain primary hydroxyalkanes, by introducing hydrogen, carbon monoxide and a hydroxylated solvent into a reaction vessel, and heating the mixture, in the presence of a ruthenium-containing catalyst and an alkaline reagent (generally while controlling and maintaining the pH in the range of 7.0 to 11.5, preferably 7.8 to 11.5), at a pressure within the range of 200 to 1000 atmospheres and at a temperature within the range of 150° to 300° C. The liquid hydroxyl-containing reaction medium may be water or an alcohol such as a primary hydroxyalkane having from 1 to 10 carbon atoms per molecule.

The products obtained by the process of this invention are, in general, mixtures containing, in many instances, at least 90%, and often as high as 95% to 98%, of straight-chain primary alcohols ranging from methanol to longer chain alcohols having, in particular embodiments, from 2 to 15 carbon atoms per molecule. The quantity of methanol formed is extremely small. A substantial proportion of the reaction products usually consists of alcohols containing from 2 to 10 carbon atoms per molecule, with minor amounts of $C_{11}$ to $C_{15}$ alcohols, and higher molecular weight waxy products.

The invention is based in part upon the discovery that pH is a very important factor in determining the nature of the reaction product obtained in the reaction between CO and $H_2$ in the presence of a ruthenium-containing catalyst and an ionizing solvent, such as water; for example, if the pH is not controlled the reaction mixture becomes at least slightly acidic due to the formation of carbon dioxide and at least traces of carboxylic acids, and this acidity has a very profound effect upon the subsequent course of the reaction, causing the formation of relatively longer chain products, such as waxy alcohols containing up to 50 or more carbon atoms per molecule (cf. copending application of Hager and Howk, S. N. 87,114, filed April 12, 1949). If the pH is more strongly acidic, high molecular weight waxy products are formed in still greater proportion.

Ruthenium, and compounds thereof, are specific in their effect upon this reaction. It has been found that other catalysts such as cobalt, nickel, copper, manganese, their oxides and salts or the metal chromites do not lead to straight chain primary alcohols under the conditions of this process. Ruthenium is most conveniently introduced into the reaction mixture in the form of its dioxide, which is believed to be reduced in situ. It is quite possible that under the reaction conditions the ruthenium is converted to a salt of a ruthenium hydrocarbonyl, but the invention is not necessarily limited by any such explanation or theory.

The ruthenium-containing substances which may be employed in the practice of the invention include not only ruthenium metal, ruthenium oxides (e. g., dioxide, sesquioxide or tetraoxide), and ruthenium carbonyls (e. g., diruthenium nonacarbonyl, ruthenium carbonyl hydride), but also other ruthenium-containing compounds, such as ruthenium salts of organic carboxylic acids, which may give rise to the formation of a ruthenium carbonyl or hydrocarbonyl (or salt thereof) under the reaction conditions. The ruthenium catalysts may be used as such or on a support such as charcoal, alumina, silica gel, silicon carbide, pumice, etc. The quantity of catalyst which is employed is not highly critical, but it is desirable to use a sufficient amount to effect a reasonably rapid reaction, e. g., about 0.001% to about 20% by weight of ruthenium dioxide, or an equivalent weight of ruthenium in any other form, based on the total quantity of reaction mixture. The alkaline agents which may be employed include ammonia, amines, alkali and alkaline earth metal oxides, hydroxides, carbonates and bicarbonates, alkali and alkaline earth metal alkaline salts, alkaline buffers, etc.; any method for obtaining a pH of 7.0 to 11.5 may, in fact, be employed.

The formation of an alcohol from carbon monoxide and hydrogen may be represented, at least in part, by the equation:

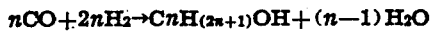

$$nCO + 2nH_2 \rightarrow C_nH_{(2n+1)}OH + (n-1)H_2O$$

It is desirable to use hydrogen and carbon monoxide in the molar ratio of at least 0.1:1. The mole ratio $H_2$:CO may be as high as 10:1 if desired. The best results are to be obtained when this ratio is between 1.5:1 and 3:1.

It is preferable to mix the synthesis gas prior to the reaction, for example, by pressuring the reactants in a vessel fitted with a free rolling brass ball to aid in mixing, although the gases may be introduced in the reaction apparatus separately and simultaneously, through baffles or similar devices. If necessary, the gases may be previously deoxygenated, for example by reaction with hot copper or by treatment with a scrubbing solution prepared from equal volumes of 20% aqueous sodium hydroxide and saturated aqueous hydroquinone solution. The gases may also be desulfurized by passing through a tower containing absorbent charcoal, or by conventional chemical desulfurization processes.

The reaction proceeds best within the relatively narrow temperature range of 180° to 225° C. Below 100° C. the reaction is too slow or does not occur. Above about 250° C., the pH drifts too rapidly and the yield of $C_2$ to $C_{10}$ alcohols decreases.

The pressure has a considerable influence on the course of the reaction. It has been found that at pressures of about 100 to 150 atmospheres, unless the pH is controlled and maintained on the alkaline side, the reaction product contains only carbon and hydrogen, and consists of hydrocarbon oils and waxes. At pressures exceeding 200 atmospheres the reaction product contains, as the chief constituents, primary monohydric alcohols, and these alcohols are largely $C_2$ to $C_{10}$ alcohols if the pH is controlled as herein set forth. On the other hand, at pressures substantially exceeding 1000 atmospheres, the reaction takes another course yielding volatile hydrocarbons. Thus, the desirable pressure range for formation of $C_2$ to $C_{10}$ alcohols is between 200 and 1000 atmospheres, the preferred range being 300 to 1000 atmospheres.

It is essential that the reaction take place in the liquid phase. As the liquid reaction medium there may be used any neutral hydroxylated solvent, including water and any alcohol such as methanol, ethanol, propanol, butanol, hexanol, octanol, decanol, benzyl alcohol, phenylethyl alcohol, ethylene glycol, hexamethylene glycol, glycerol, etc. For reasons of economy and good results, it is preferred to use either water or a primary hydroxyalkane having from 1 to 10 carbons and preferably 1 to 6 carbons per molecule. Mixtures of various alcohols, or of alcohols and water, may be used. For example, the mixed lower ($C_1$ to $C_4$) alcohols obtained in one run may be used as the reaction medium for subsequent runs. The experimental evidence indicates that the reaction medium may participate in the reaction, although such participation is apparently very much less clearly defined in alkaline media than it is in other reaction systems in which the pH is on the acid side.

It is often desirable to use in the reaction mixture a dispersing agent to facilitate the intimate mixing of all components, including the water which is always formed in the reaction, although this practice is by no means essential. Any commercial dispersing agent that has no poisoning effect on the catalyst can be used for this purpose. For the same reason, agitation of the reaction mixture is desirable, although not essential.

The process may be carried out batchwise in a suitable pressure vessel. The progress of the reaction may be followed by the drop in pressure, the reaction being continued by further additions of carbon monoxide and hydrogen until an optimum amount of reaction product relative to the size of the vessel has been formed. The process may also be carried out continuously, for example by pumping the gas mixture and the liquid reaction medium at the required pressure over a fixed catalyst bed in a heated zone at a predetermined rate.

The invention is illustrated in greater detail by the following example.

*Example 1.*—In a series of experiments utilizing aqueous solvents the effect of pH on the synthesis of alcohols from CO:2H$_2$ at 190° to 220° C. under 200 to 800 atmospheres pressure for 2 to 6 hours in the presence of a ruthenium-containing catalyst (6 grams RuO$_2$ per 325 cc. of reaction space) was determined. The results were as follows.

| Solute | Conc'n | pH of Solution | | Non-Gaseous Products | | | |
|---|---|---|---|---|---|---|---|
| | | In | Out | Total wt. | $C_2$-$C_{10}$ alcohol cut (per cent of Total) | $C_{10}$-$C_{15}$ alcohol cut (per cent of Total) | Wax (per cent of Total) |
| H$_3$PO$_4$ | 0.33 molal (1.0 molal H+) | 1.1 | 1.8 | 24 grams | <3 grams (<12%) | | 21 grams (>88%). |
| Acidic Phosphate Buffer | 0.5 Molal NaH$_2$PO$_4$ 0.05 Molal Na$_2$HPO$_4$ | 5.4 | | 14 grams | 3.5 grams (25%) | | 10.5 grams (75%). |
| None | None | 6.6 | 4.8 | 19.4 grams | 7 grams (36%) | 5 grams (26%) | 7.4 grams (38%). |
| NH$_3$ | 0.5 Molal | 11.5 | 7.5 | 16.7 grams | 6.6 grams (39%) | 3.7 grams (22%) | 6.4 grams (38%). |
| NaHCO$_3$ | 0.5 Molal | 8.3 | 7.1 | 22 grams | 17 grams (77%) | 2 grams (10%) | 3 grams (13%). |
| NaOCHO | 0.5 Molal | 8.1 | 7.3 | 18.5 grams | 15 grams (81%) | | 3.5 grams (19%). |
| NaOH | 1.0 Molal | >11 | | 19.6 grams | 17 grams (82%) | | 2.6 grams (13%). |
| KHCO$_3$ | 0.5 Molal | 8.0 | 8.0 | 24 grams | 22 grams (91%) | | 2.2 grams (9%). |

*Example 2.*—In a series of experiments utilizing alcoholic solvents under the general conditions employed in Example 1 the following results were obtained with alkaline solutes.

| Solvent | Solute | Non-Gaseous Products [1] | | | |
|---|---|---|---|---|---|
| | | Total wt. | $C_1$-$C_{10}$ alcohol cut (percent of Total) | $C_{10}$-$C_{15}$ alcohol cut (percent of Total) | Wax (percent of Total) |
| Methanol | None | 16.6 grams | 7 grams (42%) | 2 grams (12%) | 7.6 grams (46%). |
| 1-Propanol | None | 13.8 grams | 4 grams (29%) | 3.7 grams (27%) | 6.1 grams (44%). |
| Do | 1.0 Molal NaOH | 8 grams | 8 grams (>90%) | | |
| 80% Methanol 20% $H_2O$ | 0.1 Molal $KHCO_3$ | 8.4 grams | 8 grams (>90%) | | 0.4 grams (5%). |
| Methanol | 0.5 Molal $NH_3$ | 8.2 grams | 7 grams (85%) | | 1.2 grams (15%). |

[1] Small amounts of salts of organic carboxylic acids formed not included.

As can be seen by the foregoing description, this invention makes it possible to synthesize from carbon monoxide and hydrogen a series of primary, monohydric, straight chain alkanols which can be easily separable into individual components, or into cuts of selected boiling ranges. The alcohols provided by this process may be used in any of the numerous applications described in the technical literature for straight chain, primary aliphatic alcohols.

I claim:

1. A process for preparing alcohols which comprises introducing into a reaction vessel a mixture of carbon monoxide, hydrogen, a hydroxylated solvent of the class consisting of water and primary hydroxyalkanes having from one to ten carbon atoms per molecule, heating the said mixture in the presence of a ruthenium-containing substance and an alkaline reagent which controls and maintains the pH within the range of 7.0 to 11.5, at a temperature within the range of 150° to 300° C. under a pressure within the range of 200 to 1000 atmospheres, the mol ratio of hydrogen to carbon monoxide being initially from 0.1:1 to 10:1, whereby a reaction occurs resulting in the formation of a mixture of straight chain primary hydroxyalkanes in which the number of carbon atoms per molecule is from 2 to 10 as the chief reaction products, and thereafter separating from the resulting mixture hydroxyalkanes in which the number of carbon atoms per molecule is within the range of from 2 to 10.

2. A process for preparing alcohols which comprises introducing into a reaction vessel ruthenium dioxide, carbon monoxide, hydrogen, water, and an alkaline reagent which controls and maintains the pH within the range of 7.8 to 11.5, heating the resulting mixture at a temperature within the range of 150° to 300° C. under a pressure within the range of 200 to 1000 atmospheres, the mol ratio of hydrogen to carbon monoxide being initially from 1:1 to 10:1, whereby a reaction resulting in the formation of a mixture of straight chain primary hydroxyalkanes in which the number of carbon atoms per molecule is within the range of from 2 to 10, as the chief reaction products, occurs and thereafter separating from the resulting mixture hydroxyalkanes in which the number of carbon atoms per molecule is within the range of from 2 to 10.

3. The process of claim 2 in which the alkaline reagent is an alkali metal salt of an organic carboxylic acid.

4. The process of claim 2 in which the alkaline reagent is an alkali metal bicarbonate.

5. The process of claim 2 in which the alkaline reagent is an alkali metal hydroxide.

6. A process for preparing alcohols which comprises introducing into a reaction vessel ruthenium dioxide, carbon monoxide, hydrogen, water, and an alkaline reagent which controls and maintains the pH within the range of 7.0 to 11.5, heating the resulting mixture at a temperature within the range of 180° to 225° C. under a pressure within the range of 300 to 1000 atmospheres, the mol ratio of hydrogen to carbon monoxide being initially from 1.5:1 to 3:1, whereby a reaction resulting in the formation of a mixture of straight chain primary hydroxyalkanes in which the number of carbon atoms per molecule is within the range of from 2 to 10, as the chief reaction products, occurs and thereafter separating from the resulting mixture hydroxyalkanes in which the number of carbon atoms per molecule is within the range of from 2 to 10.

7. The process of claim 6 in which the alkaline reagent is an alkali metal salt of an organic carboxylic acid.

8. The process of claim 6 in which the alkaline reagent is an alkali metal bicarbonate.

9. The process of claim 6 in which the alkaline reagent is an alkali metal hydroxide.

WILLIAM F. GRESHAM.

REFERENCES CITED

The following references are of record in the file of this patent:

UNITED STATES PATENTS

| Number | Name | Date |
|---|---|---|
| 1,770,165 | Patart | July 8, 1930 |
| 2,327,066 | Roelen | Aug. 17, 1943 |
| 2,352,328 | Kleine | June 27, 1944 |